United States Patent [19]
Saunders

[11] 3,859,591
[45] Jan. 7, 1975

[54] SOFT TURN-ON POWER SWITCHING CIRCUIT

[75] Inventor: Norman B. Saunders, Weston, Mass.

[73] Assignee: Display Enterprises, Inc., Rockland, Del.

[22] Filed: July 2, 1973

[21] Appl. No.: 375,550

[52] U.S. Cl. ........ 323/18, 307/252 UA, 323/225 C, 323/24
[51] Int. Cl. ............................................. G05f 1/44
[58] Field of Search ............ 307/23.5, 252 UA, 261; 321/47; 323/16, 18, 19, 225 C, 24, 38; 328/133, 150

[56] References Cited
UNITED STATES PATENTS

| | | | |
|---|---|---|---|
| 3,363,143 | 1/1968 | Cavanaugh | 323/24 UX |
| 3,514,580 | 5/1970 | Brockway | 323/24 UX |
| 3,593,042 | 7/1971 | Cook | 307/261 |
| 3,633,094 | 1/1972 | Clements | 323/24 |

*Primary Examiner*—A. D. Pellinen
*Attorney, Agent, or Firm*—Connolly and Hutz

[57] ABSTRACT

A triac is turned on during each successive half wave of AC in response to zero-crossing signals which generate a composite ramp voltage, including short sawtooth and long ramp voltages, which provides triggering signals after a predetermined threshold is exceeded. When the composite wave is continuously above the threshold, a zero-crossing switch is activated to bypass the AC signal around the soft turn-on part of the circuit, directly into the gate of the triac, to apply all of the AC power to the load after the soft turn-on has been accomplished. A circuit reset component has an input connected to the zero-crossing detector and its output connected to the generators for discharging the generators to their starting condition any time the AC power wave is interrupted, thus insuring soft turn-on even after momentary power interruptions. A regenerative pulse amplifier and a current amplifier are connected between the threshold detector and the triac for generating a triggering signal pulse for the triac and feeding back part of the threshold breaking pulse back into the threshold detector to reinforce it. The circuit can also perform a servo function by connecting an external signal to the circuit reset switch for limiting the level to which the long ramp generator ramp-shaped voltage wave can grow to below the predetermined threshold level whereby the period of operation of the triac is controlled in response to an applied external signal.

19 Claims, 3 Drawing Figures

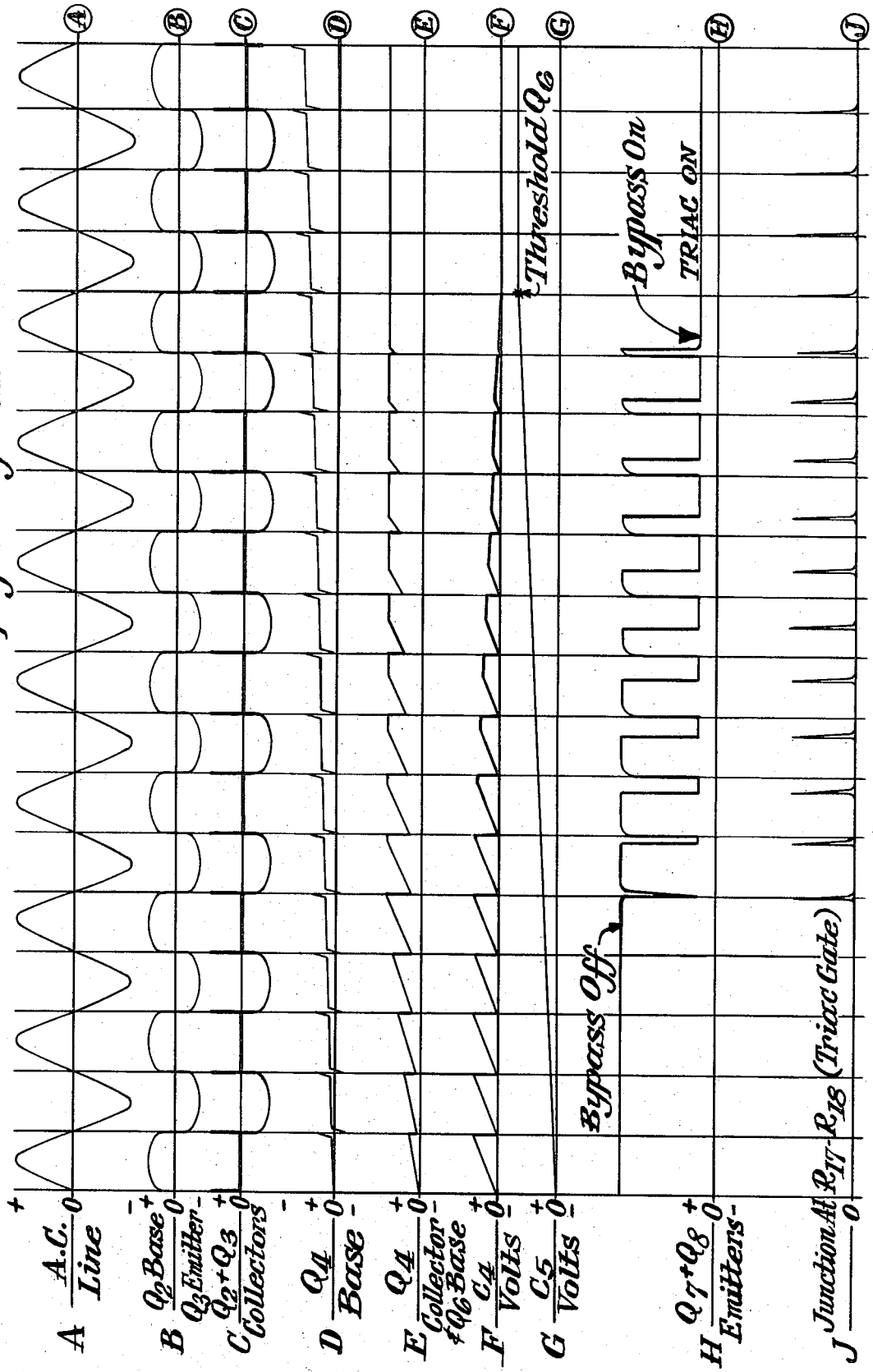

SOFT TURN-ON POWER SWITCHING CIRCUIT

BACKGROUND OF THE INVENTION

Soft turn-on devices are used to gradually apply current to sensitive electrical components, such as motors, temperature controlled heaters or light bulbs, whose starting resistance is only a fraction of normal operating resistance. Most existing soft turn-on devices permanently absorb a portion of the operating power even after a soft turn-on is accomplished and may not operate after short interruptions of power. Some have the disadvantage of utilizing only half of the AC power wave and being capable only of performing the soft turn-on function. An object of this invention is to provide a soft turn-on AC power circuit which bypasses full power to the load after turn-on, which always operates on turn-on even after momentary power interruptions, and which may also be utilized as a servocontrol feedback circuit, for regulating an external input which is a function of the supplied load.

SUMMARY

In accordance with this invention a thyristor, such as a triac, is turned on during each successive half wave of AC in response to zero-crossing signals which generate a composite ramp voltage, including short sawtooth and long ramp voltages, which provides triggering signals after a predetermined threshold is exceeded. When the composite wave is continuously above the threshold, a zero-crossing switch is activated to bypass the AC signal around the soft turn-on part of the circuit directly into the gate of the triac, to apply all of the AC power to the load after the soft turn-on has been accomplished. A circuit reset component has an input connected to the zero-crossing detector and its output connected to the generators for discharging the generators to their starting condition any time the AC power wave is interrupted, thus insuring soft turn-on even after momentary power interruptions. A regenerative pulse amplifier and current amplifier may be connected between the threshold detector and the triac for generating a strong triggering signal pulse for the triac and feeding back part of the threshold breaking pulse back into the threshold detector to reinforce it. A particularly effective zero-crossing detector includes a pair of bipolar transistors having tied collectors comprising an output to which a DC power supply potential may be connected. The emitters of the transistors are tied to the bases of the other, with one tied emitter and base connected to the AC phase line and the other tied emitter and base being referenced to the AC common line. The circuit can also perform a servo function by connecting an external signal to the circuit reset switch for limiting the level to which the long ramp generator ramp-shaped voltage wave can grow, to below the predetermined threshold level whereby the period of operation of the thyristor is controlled in response to an applied external signal. The external applied signal can be a function of the supplied load, such as a derived current or voltage signal, for example from a photo detector, which modulates a light output to cause the circuit to regulate the intensity of the light.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which:

FIG. 3 is a diagram of the time relationships of the various waveforms at the particular points in the circuit of this invention.

In FIGS. 1 and 2 is shown soft turn-on circuit 10 for supplying a load 12, such as the current sensitive light bulb of a film projector, through thyristor 14, such as a triac, from a 115 volt AC supply including AC phase line 16 and AC common line 17. The period of operation of triac 14, is controlled during each half wave of AC power in response to the zero-crossing portions of the AC power wave which are detected by zero-crossing detector 18 having an input 20 connected to the AC phase line 16 and an output 22 connected to short ramp generator 24, short ramp reset 26 and long ramp generator 28. Zero-crossing detector 18 is also connected to zero-crossing switch 30 and to circuit reset 32 to perform later described functions. Outputs 33 and 34 from the short and long ramp generators are connected to summer 36, which may merely be a junction, and which is in turn connected through output line 38 to threshold detector 40. Output 42 from threshold detector 40 is connected through input 44 to regenerative pulse amplifier 46. Output 50 of regenerative pulse amplifier 46 is connected through input 52 to current amplifier 54 and through input 48 to zero-crossing switch 30. Part of output 50 is connected through feed back line 56 back to summer 36 to reinforce the initially weak threshold breaking signal. DC power supply 58 is connected through limiter 60 to provide a DC reference potential, for example 6 volts, to the various components of the circuit.

Figure 1:
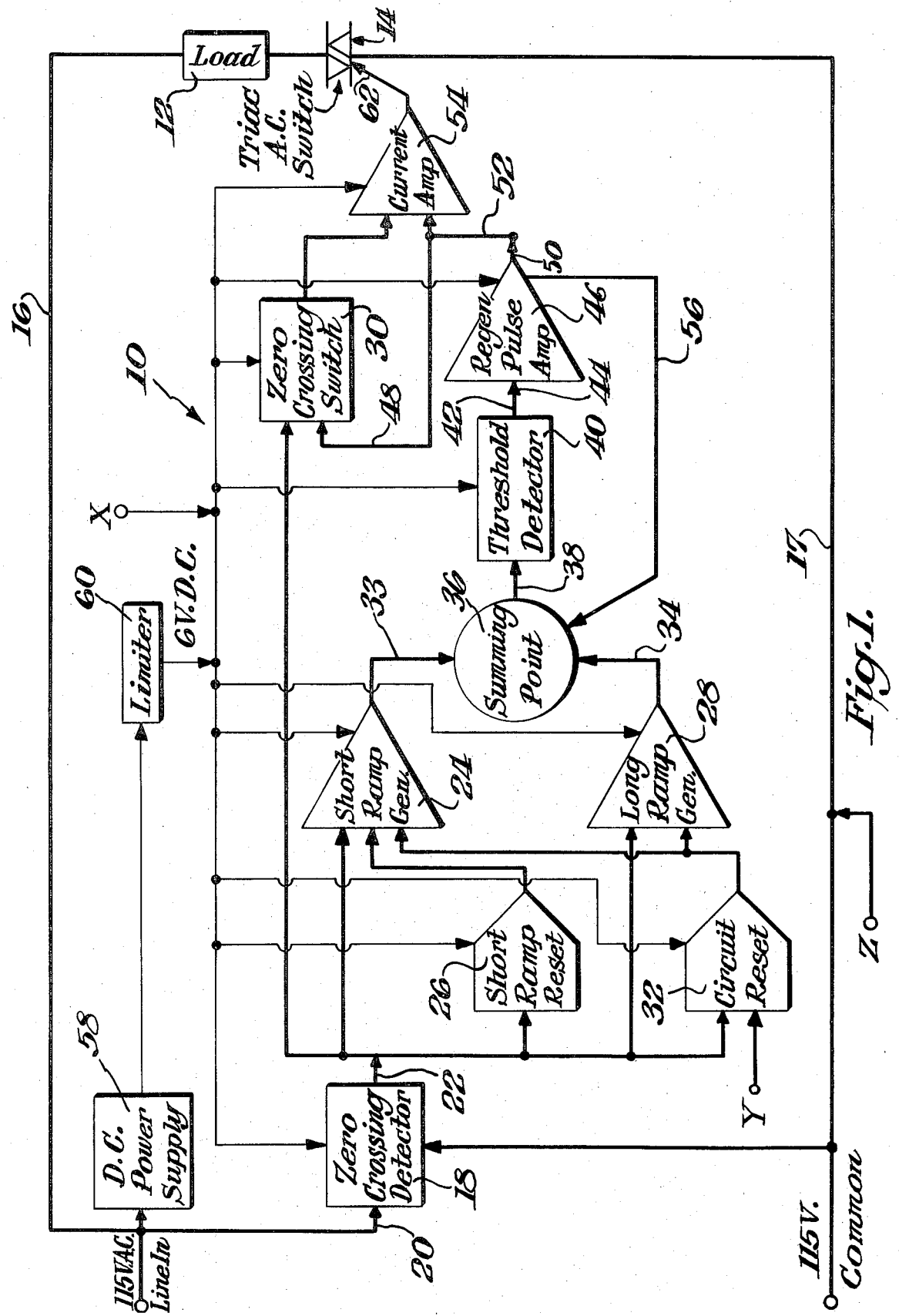
FIG. 1 is a schematic diagram of one embodiment of this invention.

Thyristor 14 is any signal triggered type of thyristor, including the aforementioned triac or a solid state controlled rectifier (SCR). Triac 14 has for example a gate 62 through which signal impulses are supplied. Thyristors are a group or class of solidstate devices that include the SCR and the triac described above. A thyristor is a PNPN device having four layers. It is bistable and is either all on or all off, in response to an internal feedback action. A thyristor may have a signal gate, like the SCR or the triac, or may be fired by either of two gates, like the SCS (silicon controlled switch).

The triac (triggers on AC) which can block voltage of either polarity but which starts electron flow in either direction by means of an electron pulse in or out of its single gate. The triac has four major layers NPNP, but several N regions are fitted into its lower P layer. One of these N regions serves as a terminal $T_1$, and the other is the gate. Meanwhile, the upper P layer is made to protrude through part of the top N layer to form terminal $T_2$. These layers are formed by film techniques.

Circuit 10 functions to slowly increase the conduction angle of current through the load 12, so as to give substantially constant rate of change of power, from complete 0 to full 100 percent duty cycle and rapidly reset upon removal of power. It also has a simply 6 VDC power supply consisting of $R_1$, $R_2$, $D_1$, $D_2$ and $C_1$ whose output is regulated by the LIMITER, $Q_1$, an avalanche diode.

Figure 2:
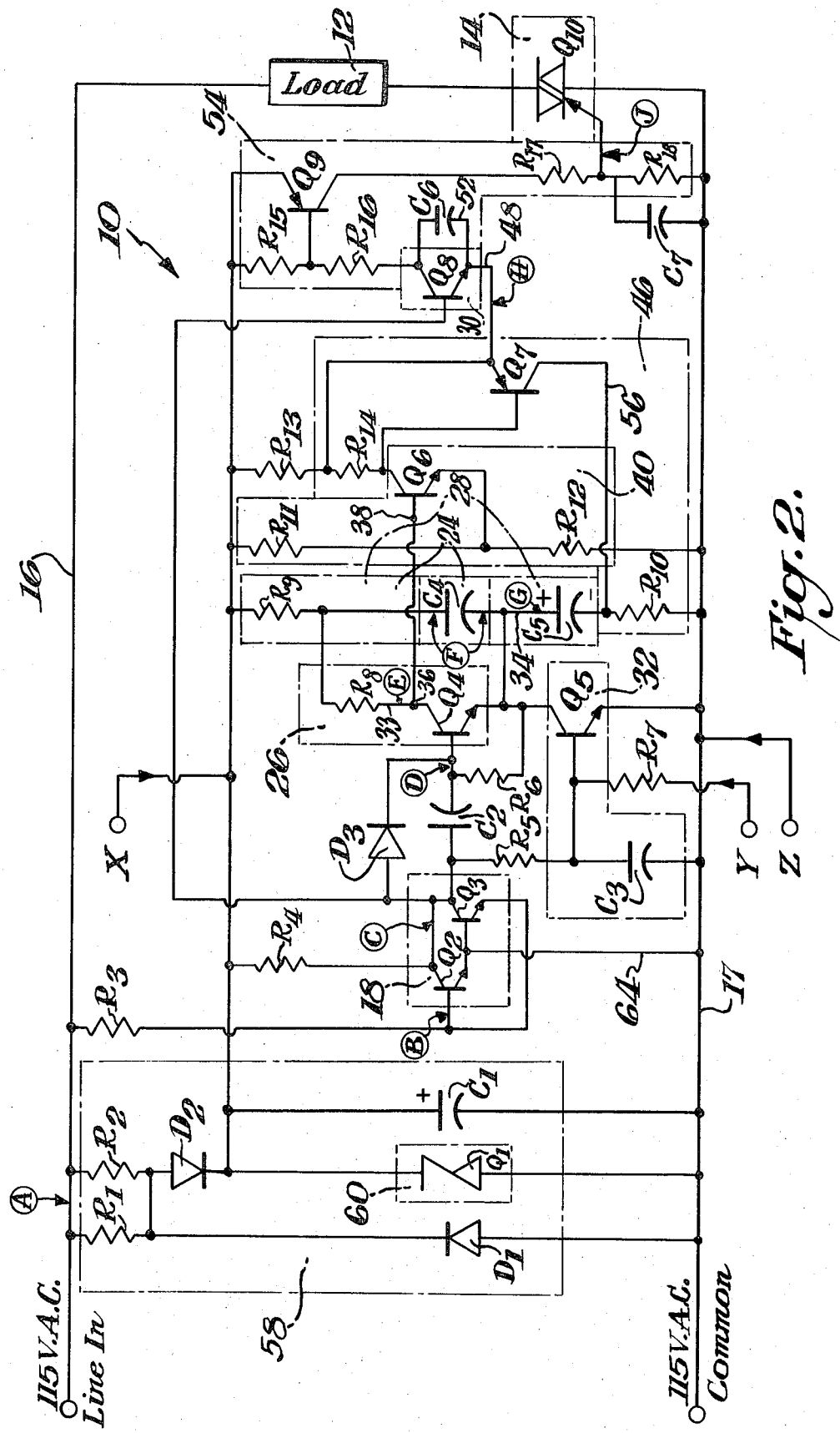
FIG. 2 is a wiring diagram for the embodiment shown in FIG. 1.

Zero-crossing detector 18 uniquely includes transistors $Q_2$ and $Q_3$ connected as shown in FIG. 2. The collectors of transistors $Q_2$ and $Q_3$ are tied together to provide a common output. The emitters of $Q_2$ and $Q_3$ are tied to the bases of the other. The base of $Q_2$ and emitter of $Q_3$ are tied to the AC phase line 16 through $R_3$. The tied emitter of transistor $Q_2$ and base of $Q_3$ are connected to the AC common line 17 through line 64. The tied collectors of $Q_2$ and $Q_3$ provide an output signal each time the AC power wave crosses zero as later described.

Transistors $Q_2$ and $Q_3$ sense the zero-crossings of the line voltage through resistor $R_3$ every half-cycle after power is applied, by remaining off when the line voltage is within a narrow zone near zero, and by being on all the rest of the time during each half-cycle: $Q_2$ for positive half-cycles, $Q_3$ for negative half-cycles.

When line voltage is in the zero-crossing zone, $Q_4$ is biased on, setting the potential across $C_4$ to zero volts. During this brief period, base current flowing through $R_4$ applies a small amount of charge on $C_5$. Additional small amounts of charge are placed on $C_5$ at each successive zero-crossing. The major charge comes from continuous current through $R_9$ to $C_5$, slowly raising the voltage across that component (long ramp generator). Toward the end of the long ramp more and more of this current is diverted to the base of $Q_6$, which occurs from time of firing to the next zero-crossing.

When line voltage reaches a value to turn on $Q_2$ or $Q_3$, $Q_4$ is turned off allowing the current flowing through $R_9$ to charge $C_4$, the short ramp generator. The voltage at the base of transistor $Q_6$ is the sum of the voltages appearing across $C_4$ and $C_5$.

After a sufficient number of half-cycles have occurred, (approximately 15 with the values chosen), the voltage at the base of $Q_6$ reaches a level sufficiently high to turn on $Q_6$, late in the half-cycle. With the continually increasing voltage across $C_5$ and the recharging of $C_4$ during each half-cycle, this point is reached earlier with each successive half-cycle of the AC line until the voltage across $C_5$ is itself great enough to bias $Q_6$ on after which time additional excursions of the line voltage have no effect, and the soft turn on phase is completed, During the soft turn on phase, each time the $Q_6$ turn on threshold is reached, a regenerative reaction occurs due to the switching action of transistor $Q_7$, causing the collector currents through $R_{10}$ to raise the voltages on $C_4$ and $C_5$ thereby "pushing" more current into the base of $Q_6$. Transistors $Q_6$ and $Q_7$ thus form a 2-stage amplifier of the regenerative type (univibrator) whose timing (pulse length) is controlled by $C_6$ and $R_{16}$ (10 uSec). The threshold is set by the potential divider $R_{11}$ – $R_{12}$ and the base-emitter potential of $Q_6$.

Transistor $Q_7$ also performs as an emitter follower or current amplifier turning on $Q_9$ through $C_6$. Transistors $Q_6$, $Q_7$ and $Q_9$ together constitute a multi-stage current amplifier, transforming the 10 micro-ampere pulse current at the base of $Q_6$ into a 200 milliampere pulse at the collector of $Q_9$. $R_{17}$ serves to limit this current. $R_{18}$ establishes the voltage necessary to turn on the Triac AC line switch in series with the line load. $C_7$ eliminates spurious turn-ons resulting from dV/dt effect within the triac switch when AC power is first applied to the circuits.

During the soft turn on $Q_8$ is inoperative. But, after the soft turn on phase is completed and transistor $Q_6$ is held on continuously, the emitter of $Q_8$ is pulled substantially toward the base of $Q_8$ decreasing $Q_8$ base-emitter voltage, permitting $Q_8$ to be turned on at each zero-crossing, and thereby switching on the triac for the full half-cycle each half-cycle thereafter. Hence, $Q_8$ serves to bypass the soft turn on circuitry after it is not longer needed. The diode $D_3$ puts the low frequency components, and the capacitor $C_2$ puts the transients of the zero-crossing pulse that exist at the collectors of $Q_2$ and $Q_3$ into the base of $Q_4$ (during the soft turn on phase) to turn it on and $Q_6$ and $Q_7$ off before this voltage at the base of $Q_6$ rises far enough to turn $Q_6$ on. This prevents $Q_8$ from being turned on in response to spurious signals. The resistor $R_8$ limits the current through $Q_4$ when $Q_4$ is turned on.

During both soft turn-on and normal operating phases of the device, transistor $Q_5$ is held off by the average collector potential of $Q_2$ and $Q_3$ being so low as to never permit large charge accumulation on $C_3$. When power is removed from the circuits, charge stored at $C_1$ is permitted to transfer to $C_3$ bias $Q_4$ and $Q_5$ to the on state, discharging $C_4$ and $C_5$, and thereby quickly resetting the ramp generators for the next application of line power.

External connections X and Y or Y and Z provide inputs for using circuit 10 as a modulator or controller. A function of load 12, such as light output, can be maintained constant by applying the monitoring signal to external input terminals or connections X, Y and Z in various combinations. The external signal applied through $R_7$ is applied to circuit reset switch $Q_5$ to limit the level to which the long ramp generator ramp-shaped voltage wave can grow — to below the predetermined threshold level. This controls the period of operation of triac 14 in response to the applied external signal to increase or decrease the current applied to the load in order to maintain it constant. Circuit 10 can thus provide soft turn-on and thereafter perform a modulating or monitoring servocontrol feedback function to control a load responsive function. The regulating signal can be derived from a photo detector such as a photo diode or a photo resistor or from any current or voltage-producing transducer to which the load output is applied, or any external signal source.

Soft turn-on circuit 10 has various advantages including a positive delay of power application which slowly edges into full power, thus allowing other switch loads to settle before full power is applied. The extremely gradual voltage increase may allow brighter lighting bulbs to be utilized because full voltage is not applied until their filaments become fully heated and develop full resistance. The thyristor, such as a triac or solid state control rectifier, is continually turned on after soft turn-on exactly at zero-crossings, of the AC line, which minimizes power loss and radio frequency interference. The circuit reset insures soft turn-on even after momentary interruptions of power which fully protects the output load and provides rapid automatic reset after interruptions. As previously mentioned, the circuit can also be utilized for automatic voltage, current or intensity control, even in response to low power input signals. The circuit is inherently insensitive to the switching transients. It also is simple and economical by virtue of utilizing several components for a multitude of functions. Most other soft turn-on circuits have either a variable resistance in series with the load, which is never completely removed or an inherent delay in turn on after zero-crossing. This prevents full utilization of applied power, which this present circuit advantageously provides.

In FIG. 3 are shown the time relationships of the principal waveforms occurring in indicated portions of the circuit of this invention. Each of these curves are designated by letters A–J corresponding to points in the wiring diagram, FIG. 2, upon which these letters are also applied. The components at which these waveforms occur are also designated on FIG. 3.

Waveform A shows the standard AC power sine wave with which each of the following waveforms are coordinated.

Waveform B shows the zero-crossing signal provided at the base of transistor $Q_2$ and the emitter of transistor $Q_3$, which constitute the zero-crossing detector. A steep vertical signal is provided each time the AC power line crosses the zero axis. Waveform C is the signal derived at the tied collectors of zero-crossing detecting transistors $Q_2$ and $Q_3$ showing the sharp spike shaped signal at each zero-crossing. Waveform D shows the sharp signal occurring at the base of transistor $Q_4$ at zero-crossing which governs the discharging of short ramp generator $C_4$ at the end of each half-cycle as the incremental additional charging of the long ramp generator $C_5$.

Waveform E shows the composite waveform at the junction of the collector of $Q_4$ and the base of $Q_6$, which is limited to the threshold level set by $R_{11}$, $R_{12}$ and the base emitter voltage of $Q_6$. Waveforms F and G are the short ramp generator $C_4$ voltage waveform and the long ramp generator $C_5$ voltage waveform, which are combined to provide the composite waveform E.

Waveforms H and C respectively show the signals at the tied emitters of $Q_7$ and $Q_8$ (H) and the voltage at the base of $Q_8$ (C). These waveforms combine to turn bypass transistor $Q_8$ fully on after the soft turn on phase is completed.

Final waveform J shows the signal at the junction of $R_{17}$ and $R_{18}$ and the triac gate indicating how the triac is turned on earlier during each successive half cycle to gradually provide more and more AC power during each half-cycle to the load until it is continuously on. Waveforms E-J are compressed and the slope of the curves and attainment of threshold bypass conditions are indicated earlier than actual to facilitate illustration in the limited drawing space. With the following advantageous set of component values, the triac will be turned on the first time late in the half-cycle — approximately 20 cycles after AC power is applied to the circuit, and will not be turned on at the beginning of each half-cycle until approximately 800 more cycles have occurred to thus end the soft turn on phase.

The following is an advantageous set of values for the resistors and capacitors shown in FIG. 2 of this application.

| Resistors | |
|---|---|
| R1 | 47 k |
| R2 | 47 k |
| R3 | 47 k |
| R4 | 56 k |
| R5 | 470 k |
| R6 | 560 k |
| R7 | 1 k |
| R8 | 220 ohms |
| R9 | 680 k |

-Continued

| Resistors | |
|---|---|
| R10 | 220 ohms |
| R11 | 33 k |
| R12 | 10 k |
| R13 | 10 k |
| R14 | 100 k |
| R15 | 10 k |
| R16 | 1 k |
| R17 | 33 ohms |
| R18 | 1 k |
| Capacitors | |
| C 1 | 60 µf, 10 v |
| C 2 | 47 pf |
| C 3 | 47 nf |
| C 4 | 47 nf |
| C 5 | ≥ 2 µf |
| C 6 | 10 nf |
| C 7 | approx. 0.2 µf |

I claim:

1. A power switching circuit for controlling the application of an AC power source to a load through a thyristor turned on by actuating signals applied to its gate comprising a zero-crossing detector having an input connected to said AC power source for generating a zero-crossing signal each time the AC wave passes through zero, a short ramp generator and a short ramp reset for generating a sawtooth voltage wave in response to each zero-crossing signal, a long ramp generator for generating a ramp-shaped voltage wave which grows in response to each successive zero-crossing signal, the outputs of said generators being connected to a summer which adds them into a composite ramp wave, a threshold detector connected to said summer for determining when said composite wave rises above predetermined threshold level whereby a turn-on signal is generated, said threshold detector being connected to said gate for turning on said thyristor at earlier times during each successive AC half-cycle wave, a zero-crossing switch connected between said zero-crossing detector and said gate for applying said zero-crossing signal directly to said gate, said threshold detector being connected to said zero-crossing switch for enabling it to be turned on after said composite ramp wave is completely above said predetermined threshold level whereby said zero-crossing signal is bypassed from said short ramp generator and said short ramp reset and said long ramp generator and directed through said zero-crossing switch into said gate for causing said thyristor to apply all of said AC power to said load.

2. A circuit as set forth in claim 1 wherein a circuit reset means has an input connected to said zero-crossing detector for making said circuit reset means inoperative when said AC power wave is being provided, said circuit reset means having an output connected to said short and long ramp generators for discharging them to their initial bottom condition when said AC power is off whereby said circuit is reset to bottom starting level upon interruption of power.

3. A circuit as set forth in claim 2 wherein an external connection means is provided to said circuit reset means for connecting an external signal which limits the level to which said long ramp generator ramp-shaped voltage wave can grow to below said predetermined threshold level whereby the period of operation of said thyristor is controlled in response to said applied external signal.

4. A circuit as set forth in claim 3 wherein said external signal is a function of the power applied through said thyristor to said load whereby said circuit is constituted to perform a servo control function.

5. A circuit as set forth in claim 1 wherein a pulse amplifier is connected between said threshold detector and said gate for providing signal pulses to turn said thyristor on when said composite ramp wave is above said threshold level.

6. A circuit as set forth in claim 5 wherein said pulse amplifier and threshold detector act together in a regenerative manner.

7. A circuit as set forth in claim 5 wherein a current amplifier is connected between said pulse amplifier and said gate for amplifying said signals.

8. A circuit as set forth in claim 1 wherein a current amplifier is connected between both said threshold detector and said zero-crossing switch and said gate whereby signals from said threshold detector and said zero-crossing switch to said gate are amplified.

9. A circuit as set forth in claim 8 wherein said current amplifier includes input and bias circuitry, said zero-crossing switch having a collector load, and common components in said current amplifier and said zero-crossing switch comprising both said input and bias circuitry and said collector load.

10. A circuit as set forth in claim 9 wherein said common components comprise series-connected capacitor and resistor means.

11. A circuit as set forth in claim 1 wherein a pulse amplifier is incorporated within said threshold detector and said gate, and connection means connecting part of the output of said pulse amplifier back into said threshold detector whereby the strength of the output of said threshold detector to said gate is augmented.

12. A circuit as set forth in claim 11 wherein a current amplifier is connected between said pulse amplifier and said gate said current amplifier having input and bias circuitry, said pulse amplifier having an emitter-follower load, and common components in said current amplifier and said pulse amplifier comprising both said input and bias circuitry and said emitter-following load.

13. A circuit as set forth in claim 12 wherein said common components comprise series-connected capacitor and resistor means.

14. A circuit as set forth in claim 1 wherein said zero-crossing detector comprises a pair of bipolar transistors having collectors tied together, the emitters of each transistor being tied to the base of the other, said AC power source having a phase and a common line, the base of one transistor and emitter of the other being tied to said AC phase line, and the emitter of said one transistor and the base of said other transistor being referenced to said AC common line, said transistors being constructed and arranged to turn off and on each time said AC wave passes through zero whereby said zero-crossing signals are provided at the output of said transistors comprised by said tied collectors.

15. A circuit as set forth in claim 14 wherein a DC power supply potential is connected to said tied collectors.

16. A circuit as set forth in claim 14, wherein said zero-crossing detector provides an output signal between said tied collectors and said AC common line whenever the voltage at the connection to said AC phase line is smaller than the threshold voltage of either transistor, one transistor sensing the AC phase line voltage condition during its positive swing, the other transistor sensing said AC phase line voltage condition during its negative swing, both said transistors acting in concert to provide a voltage pulse at said output when said AC phase line is in a narrow zone at zero-crossing, said output voltage pulse starting just prior to, ending shortly after, and spanning the instant of each said AC phase line voltage zero-crossing.

17. A circuit as set forth in claim 1 wherein said thyristor comprises a triac.

18. A circuit as set forth in claim 1 wherein a DC power supply potential is connected to said zero-crossing detector, short ramp reset, short ramp generator, long ramp generator, threshold detector, zero-crossing switch, pulse amplifier, current amplifier and circuit reset means.

19. A circuit as set forth in claim 1 wherein said short and long ramp generators comprise capacitor means and a charging circuit which they share in common.

* * * * *